Sheet 1. to Sheet 4.
J. A. Wilkinson
Making Weavers' Reed's.
No. 50.
Reissued Apr. 22, 1843.
8974X
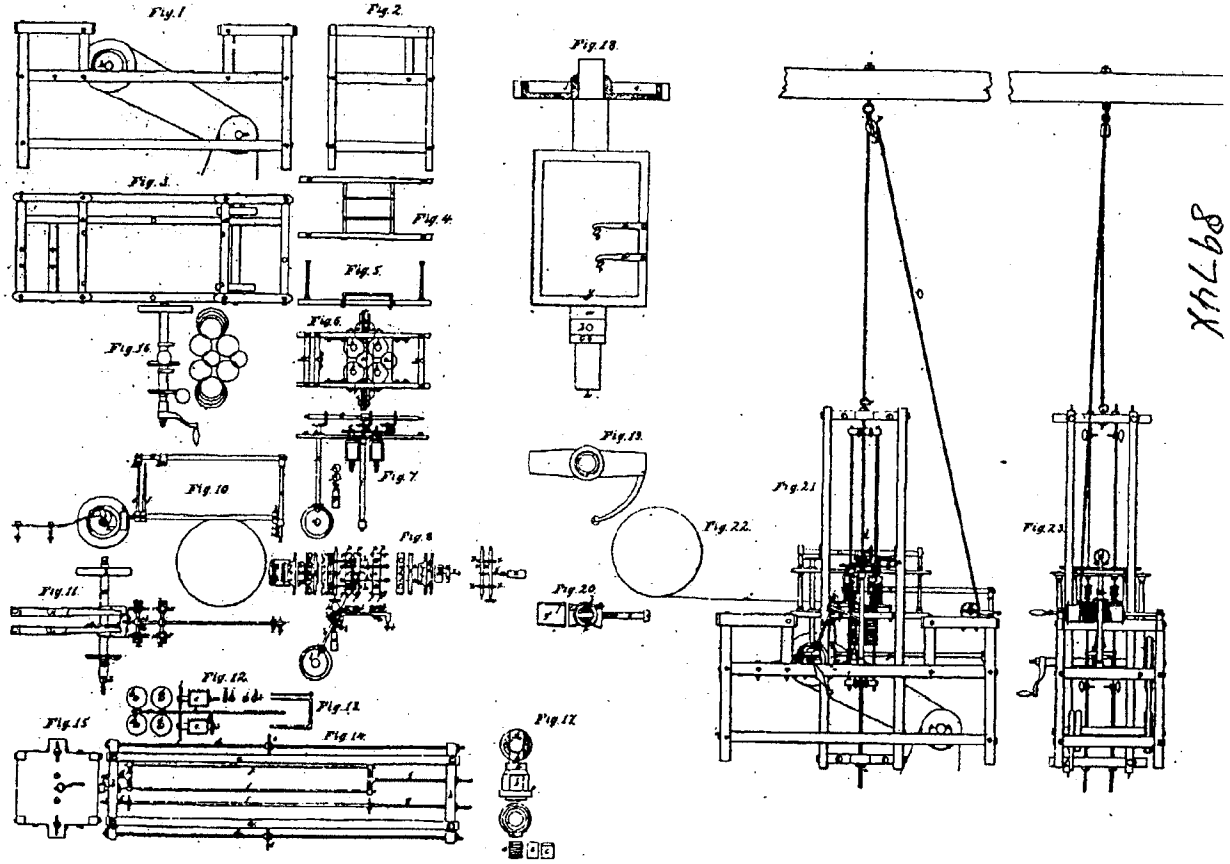

Sheet 2, 2 Sheets
J. A. Mikinson.
Making Weavers' Reeds.
No. 50. Reissued Apr. 22, 1843.
8974 X
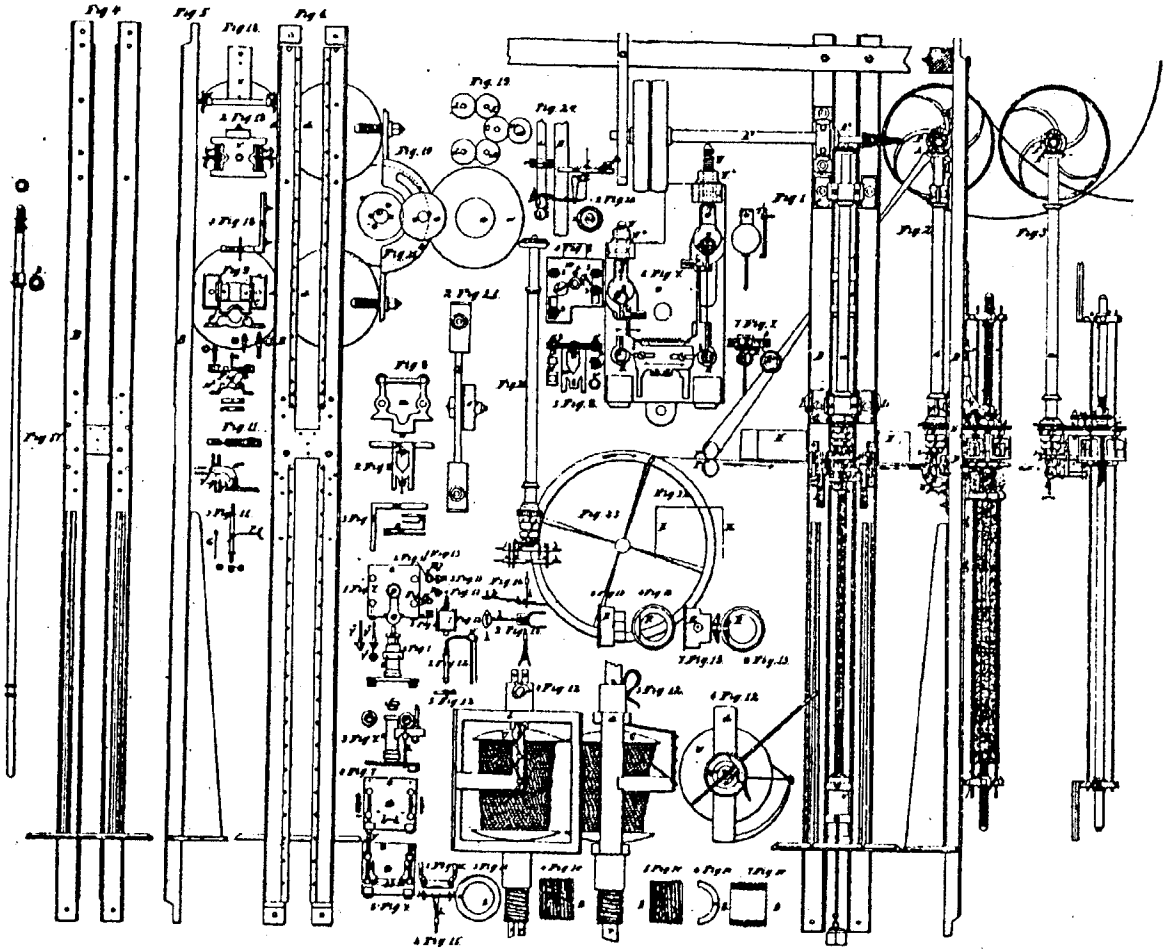

UNITED STATES PATENT OFFICE.

JEPTHA A. WILKINSON, OF PROVIDENCE, RHODE ISLAND.

IMPROVEMENT IN MACHINES FOR MAKING WEAVERS' REEDS BY POWER.

Specification forming part of Letters Patent dated July 17, 1835; Reissue No. 50, dated April 22, 1843.

*To all whom it may concern:*

Be it known that I, JEPTHA A. WILKINSON, of Providence, Rhode Island, have invented an Improvement in Machines for Making Weavers' Reeds by Power, of which the following is a specification.

*Plan* 1.

Plan 1 represents the individual parts and plan of the original reed-machine.

Figure 1 represents the side view of the wooden frame-work of the machine put together with joint-bolts; *a*, driving-shaft; *b*, main shaft with cog-wheels, pulley, and straps.

Fig. 2 represents an end view of the wooden frame-work.

Fig. 3 represents a perpendicular view of the frame-work.

Fig. 4 represents the foundation of the iron frame-work, upon which the inner part of the movements of the machine are placed.

Fig. 5 represents a side view of the iron frame-work seen under Fig. 4.

Fig. 6 represents a perpendicular view of the upper part of the iron frame-work with the stud, flier, and screw-wheels. *a a*, stud-wheels; *b b b b*, flier-wheels; *c c*, screw-wheels; *d d*, holes for the reception of two upright pillars forming the bearings of the horizontal shaft *c*, (seen at *c*, Fig. 7;) *e*, hole or step of the upright shaft *b*, (seen at *b*, Fig. 7;) *f f*, slides to move the graduating-screws out or in, as may be required to accommodate the movement of wheels of greater or less diameter in making fine or coarse reeds.

Fig. 7 represents a side view of the upper iron frame-work, exhibiting the position of the flier-wheels, studs, and shafting, connected as they move in the machine; *a*, end of the main shaft; *b*, upright shaft; *c*, horizontal shaft; *d d*, stud-wheel shafts in the position they communicate with the flier-wheels; *e e*, fliers and wheels in the position they stand in the machine when operated on by the stud-wheels *d d; f f*, position and end of the feeding-rollers as they stand to work in the machine; *g*, weight by which the upper feeding-roller is held down, so as to press upon the wire, and thereby enable the lower roller to force the wire forward into the machine. *h* represents a hook by which the weight *g* is suspended and made to bear upon the upper feeding-roller, *f*. *i* represents a pillar by which the weight of the upper part of the iron frame-work is supported. There are two of these pillars—one on each side of the machine.

Fig. 8 represents the different parts employed to regulate the action of the fliers upon the dent, and the passage of the wire into the reed; *a a a a*, steps of the flier-noses; *b b*, steel boxes let into the block *e*, through which the dent or wire passes under the end of the flier, and which forms the bed-shear for separating the wire into dents as it advances into the machine. *f f* are counterparts to the boxes *b b*, let into the block *g* in such manner as to confine or tighten the fliers, as may be required by the action of a windlass-screw. (Seen at *h h*.) *i* represents a block for supporting the lower end of the back set of fliers, resting upon and fastened to the sills *k k*, the same as the blocks *e g*, by screws; *k k*, sills upon which the blocks *e*, *g*, and *i* are placed and supported in the machine; *l l l l l l*, screws holding the upper to the lower part of each block on the sills *k; m*, hole through block *g* to admit the passage of the pitman-head and wedge in their action upon the gages *o o; n n*, square pieces of steel or metal placed in a groove upon the lower part of and covered by the block *g*, extending from the gage *o o*, when in their place between the blocks *g* and *i*, to the wedge on the pitman-head in its operation in the opening *m*, block *g; o o*, gages or slides to conduct the wire or dent from the first to the second set of ribs, sent out and in by the braces *n n* and the action of a spring; *p p p p p p p p*, small oblong square pieces of metal fitted into the ends of the blocks *e*, *g*, and *i* by four screws, (seen at *q q q q*,) as fulcrums to the levers, (seen at *k k k k*, Fig. 11, and at *g*, Fig. 12,) in their action in the machine; *r r*, top and side view of the back set of flier-blocks; *s s*, top and side view of the lower part of same. *t t* exhibit the groove in the lower part of the block, in which the end of the sliding gages *o e* move; *r r*, top and side view of the blocks employed to hold the two upper portions of the back set of flier-blocks in their place on the sills *k k; v v*, screw employed to hold the block fast upon any required part of the sills *k k*, which may be seen again in its proper position in the block at *n*, Fig. 9. *w w* represent the two feeding-rollers connected as they stand in the frame of the machine; *x x x x*, the parts which come into contact with each other and move the dent or wire into the machine; *y*, hook placed upon the upper feeding-roller to keep it down; *z*, weight suspended by the hook *y* to keep the upper feeding-roller down during its action upon the dent, as may be seen at Fig. 9, where the feeding-rollers are represented at *h h* in a proper position to act upon the wire and send dents into the machine. 1 represents a place cut in the upper feeding-roller to receive the hook *y*, and here the rollers are represented in position to act. 2 2 represents the top and side view of the block *e*. 3 3 represents the top and side view of the counterpart seen under *g*. 4 represents the lower part of the same. 5 5 represents the place on which the end of the sliding gages *o o* move. 6 represents the lower part of the back flier-block in the position it lays under the gages *o o*.

Fig. 9 represents a side view of those portions of the machine exhibited under Fig. 8 in connection with the feeding-rollers, &c.; *a*, sill upon which the blocks and their parts rest; *b b*, nuts to confine the ends of the sills in the stronger frame-work of the machine, as seen at Fig. 5; *c c*, screws passing through the ends of the blocks; *d d d d*, braces, (seen under Fig. 8 at letters *p p p p p p p p*); *e e e*, front and back flier-blocks, (seen at *e*, *g*, and *i*, Fig. 8;) *f f*, screws serving in this place as fulcrums to the levers, (seen at *k k k k*, Fig. 11;) *g*, tube or conductor for the dent, (more plainly seen immediately before the feeding-rollers under Fig. 8.) The wire passes from the feeding-rollers directly through these tubes under the end of the flier between the ribs of the reed; *h h*, upper and lower feeding-rollers; *i*, bevel-wheel which turns upon or carries the lower feeding-roller; *k*, vertical shaft connected with the main shaft and communicating motion to the lower feeding-roller; *l*, main shaft in position to communicate motion to the feeding-rollers; *m*, weight employed to keep the upper roller down upon the wire; *n*, hook whereby the weight is suspended to the feeding-rollers; *o*, wire rim on which the rings of wire for dents are placed.

Fig. 10 represents the manner in which the main shaft is brought to act upon the fliers in giving them an endwise movement; *a*, main shaft; *b*, cam; *c*, stirrup attached by a strong screw to the end of the lever *d*; *e*, pitman connecting the upper lever, *g*, with the lower lever, *d*; *f*, wedge and pitman calculated in its operation upon the two pieces of metal (seen under *n n* between the gages *o o*, Fig. 8,) to move the gages *o o* out, to form a bridge or passage for the dent from the first to the second set of ribs; *g*, upper lever calculated to act upon the fliers through the agency of the pitman-heads *h h* and levers *k k k k*, Fig. 11. The pitman-heads *h h* are pierced with square holes of sufficient size to receive and operate upon the ends of the levers; *i*, pillar for supporting, as a fulcrum, the end of the lever *g*; *k*, support or fulcrum of the lever *d*. Both the pillar *i* and fulcrum *k* are fastened to the wooden frame-work of the machine by nuts or screws.

Fig. 11 represents the top view of diagram Fig. 10; *a*, main shaft; *b*, pulley or driving-wheel; *c c*, cog-wheels for operating upon the feeding-rollers and fliers through the agency of the shafts *b c* and studs *d d*, (seen under Fig. 7,) and *k* (seen under Fig. 9;) *d*, square for the application of a crank to turn the machine; *e e*, bearings; *f f*, springs for raising the fliers after being depressed by the cams and levers, as represented at *b d e f g h*, Fig. 10; *g*, stirrup upon which the cams are brought to bear; *h*, screw showing the manner of attaching the stirrup to the lever *i*, which is here represented in position to act upon the subordinate levers and the fliers; *j j*, pitman-heads (seen at *h h*, Fig. 10;) *h k k k*, levers for moving the fliers up and down to cut the dent; *l*, pitman-wedge (seen at *f*, Fig. 10;) *m*, screws of same; *n n n n*, transverse section of the fliers in the levers, held in the position they are made to act in their collars by the small screws which enter the collars at right angles from the opposite sides of the levers, as seen at *r r r r r r r r*; *o o*, pillar-head or fulcrum of the levers *d* and *g*, Fig. 10; *p q*, screws upon which those parallel levers bear.

Fig. 12 represents the lever in position between the fliers; *a*, the lever; *b b*, pitman-heads; *c c c c*, fliers in the wheels; *e e*, fliers lying horizontal, one of which is represented in its lever; *f f*, flier-wheels; *g*, levers fixed upon one of the fliers as it is adjusted when in the machine for action; *h*, ring or collar fixed upon the end of the flier for the reception of the lever-screws, and the movement of the flier up and down by the action of the superior lever *a*. A hole in one side of this collar shows the point where the screws of the levers enter these collars, so as to hold the collar and govern the endwise movement of the flier. *i* is a top view of the collar *h*. *j* is a side view of the outer shell or case fixed on the nose or lower end of the flier, calculated to follow the ring *h*, and to be fastened to the flier by a small screw, which may be seen and more readily understood by reference to the diagram under *k* at the right, where at *l* the screw is shown in the part of the shell where it is placed to fasten this case to the body of the flier, which is made to go onto the end of the flier as far as the first shoulder indicated on the naked end of the flier *e*, when the shell is intended to stop and be firmly fixed to the shaft or body of the flier by the lastly-described screw *l*. The collar seen at *h i* is intended to occupy the space between the first and second shoulder upon the shaft of the flier, and, as may be seen, is so calculated as to be perfectly free and to turn round, or rather stand, in the lever *g*, while the flier in the collar performs its revolution. All the fliers, collars, shells, &c., are made uniform.

Fig. 13 represents a set of braces made to enter between the ribs and go down between them through the body of the fliers, so as to keep the ribs asunder and admit of a free passage for the dent into the reed.

Fig. 14 represents the carriage of the machine; *a a*, side of the wooden frame-work; *b b*, head and foot blocks, made also of heavy pieces of plank and bolted together; *c c c c*, joint-bolts; *d d*, graduating-screws, by which, the carriage is let down; *e e*, wheels called the "screw-wheels," by the operation of which in connection with the flier-wheels, the movement of the carriage is regulated and the fineness of the reed determined; *f f f f*, ribs which are made to pass through the fliers and receive the dents and band which form the reed; *g g g g*, stretchers for taking hold of and drawing the ribs tight during the action of the machine; *h h*, ring and bolt for the application of a cord to raise the carriage when the machine is placed in order for commencing work upon a reed.

Fig. 15 represents the top of the carriage. (Seen under *b*, Fig. 14.)

Fig. 17 represents a transverse section of the box employed in the wheel upon the screw to govern the movement of the carriage; *a*, side of the box standing upright without the dies or female screws seen at *c c c c* below, and in their place at *d d*, where a horizontal transverse section of the box is seen, exhibiting the manner in which those dies or female screws are brought to bear upon the threads of the graduating-screw and kept in their place during their action in the machine by a hoop-like form of the screw-wheels *e e*. On the side of the box may be seen a key or small rib, which is intended to hold the wheel and prevent it turning upon the box when the screw-wheel is put in motion by the flier-wheels and a corresponding movement of the box required, by which arrangement the movement of the carriage and ribs is effected, and by the difference made in the number of teeth employed in the screw the fineness of the reed is determined.

Fig. 18 represents a flier of the full size with a transverse section of the flier-wheel as it is fixed onto the head of the flier by a set-screw; *a*, flier-shaft; *b*, collar; *c*, nose or shell fastened by the small screw at *c*; *d d*, conductors for carrying the band from the bobbins to the orifice *g* on its way under cover of the shell to the point of the flier *h*; *e*, section of the flier-wheel; *f*, set-screw to hold the wheel on the top of the flier; *g*, passage for the band.

Fig. 19 represents an inverted end view of the flier; *g*, orifice where the banding comes out.

Fig. 20 represents also an inverted end view of the flier in the die and box, which form the step or support of the end of the flier when in action in the machine; *a*, flier; *b*, shell or nose; *c*, die forming the bed-shear, which, with the circular edge of the shell, separates the dent from the wire; *d*, box or brace to keep the flier steady against the die in cutting the wire, and revolving to wind the band round the ribs of the reed; *e*, screw for holding the box firmly in its place and to regulate the pressure of the revolving (shell on the flier) with the cutting-edge of the die *c* or bed-shear; *f*, face of the die; *g*, hole through which the wire passes and in which it is separated by the action of the flier into dents.

Fig. 21 represents the machine all together, as it appears in actual operation; *a*, end of the main shaft; *b*, upright; *c*, horizontal, (seen at *a b c*, Fig. 7;) *d d*, end wheels; *e e*, upper ends of the fliers, (seen at *d d* and *e e*, Fig. 7;) *f f*, levers, (seen at *k k k k*, Fig. 11;) *g g*, levers, (seen at *d g*, Fig. 10;) *h*, shaft for driving the feeding-rollers, (seen at *k*, Fig. 9;) *i i*, feeding-rollers, as seen at *h h*, Fig. 9; *k k*, graduating-screws, (seen at *d d* in the carriage, Fig. 14;) *l l*, bobbins containing banding for winding the reed. *m* represents a piece of reed, made by the action of the machine. *n* represents the windlass, by which the carriage of the machine is raised; *o*, rope or cord employed; *p*, pulley attached to a beam; *q*, ring, illustrating the manner of fastening the cord to the head of the carriage.

Fig. 22 represents the position of the wire rims for supplying the reed with dents; *a*, wire rim, from which the wire may be seen extending by *a'* to the machine.

Fig. 23 represents an end view of the machine. (Illustrated under Fig. 21.)

Fig. 24 represents a scale of inches, upon which the drawings under Figs. 1, 2, 3, 4, 5, 6, 7, 8, 9, 10, 11, 12, 13, 14, 15, 21, 22, and 23 are made. The diagrams under Figs. 17, 18, 19, and 20 represent the full size of those parts employed in the machine.

Having now described the different parts of the original reed-machine, and shown how they are connected and stand for operating upon the reed, I will show how those parts are put together. The iron frame-work seen under Fig. 5 is first set upon the wooden frame seen under Fig. 3, when the other parts of the iron frame seen under Fig. 6 is mounted and fastened upon the top of the pillars standing upon the lower bars of the iron frame. The different parts illustrated under Fig. 8 are then put together as they stand upon the sills *k k*, and appear in connection under Fig. 9, and placed upon the frame under Fig. 5, where they are fastened to the strong bars, as there represented by nuts screwed to the descending ends of the sills upon the under side of the strong iron frame. The upper part of the frame of iron-work, together with the shafting, fliers, and gear, as represented under Fig. 7, being placed upon the bearings of the several parts, and in connection with the main shaft seen at *b* and driving-wheel *a*, Fig. 1, the carriage, in connection with the graduating-screws, wheels, stretchers, &c., as represented under Fig. 14, is mounted. The wire reel being placed, as represented, under Fig. 22, the ribs through the fliers and bobbins of banding, as represented at *l l*, Figs. 21 and 23, the machine is ready for action. I should, however, in this plan, show that the band, before starting the machine, is taken from the bobbin, passed over the conductors on the fliers, and through the passage under the shell in the flier, and made fast to the ribs in the fliers, which are drawn tight by the nuts upon the stretchers, as represented at *g g*, Fig. 14, and illustrated with a portion of the reed under *m*, Fig. 21. The ribs and the carriage standing in an elevated position above the machine, the two wheels seen at *e e*, Fig. 14, with the two boxes and sets of female dies, as represented at *a b c d*, Fig. 17, being placed upon the graduating-screws, the carriage is ready to move with the ribs. The wire from the rim seen at *a*, Fig. 22, being placed upon the lower feeding-roller, and the upper roller under the weight placed upon the wire, the machine is started, and as the main shaft revolves it carries in its revolution the vertical shaft *b*, the horizontal shaft *c*, studs *d d*, and fliers *e e* by the action of the first bevel-wheel on the main shaft. The second bevel-wheel on the main shaft, gearing into the inclined shaft *h*, operates, through the bevel-gear on the upper end, upon the lower feeding-roller, *i*, effecting the movement of the wire. *d*, the upper feeding-roller, by which means the dent is carried into the machine. The cams (seen at *b*, Fig. 10,) in the revolution of the main shaft, operates upon the stirup at the end of the main lever *d*, (seen at Fig. 10,) carrying the two pitmen *e f*, and the lever *g*, Fig. 10, with the four flier-levers *k k k k*, (seen at Fig. 11,) with the fliers in their endwise movement, which effects the cutting of the dent from the wire, while the revolution of the flier carries the band round the ribs of the reed. The screw-wheels being in gear with the flier-wheels at the same time the winding operations are going on, the movement of the carriage and ribs is necessarily effected, and consequently the wire is cut into dents, placed in the ribs, and wound by the fliers upon a graduated scale at one operation.

I shall now proceed to describe my improvements on the reed-machine, and to point out the manner in which those improvements are applied for the manufacture of weavers' reeds.

*Plan 2.*

Figure 1 represents a front view of the machine. Fig. 2 represents a side view as it appears when operating upon a reed. Fig. 3 represents a side elevation of the movements of the machine connected as they stand in the frame when supported by the steps, and the other figures show some of the details. 6 and 7, Fig. 7; 4, 5, and 6, Fig. 12; 5, 6, 7, and 8, Fig. 13; 3, 4, 5, 6, and 7, Fig. 14; 1 and 2, Fig. 19, together with 1 and 2, Fig. 21, exhibit the parts upon an enlarged scale, and it will be found that the same letters are used to denote the same parts wherever they are employed.

The machine consists of the main shaft *a*, placed upon the frame B parallel with and near to the fliers *d d*, with which the main cog *u* communicates through the agency of the wheel *c*, as may be seen in 1 and 2 plans, Fig. 19.

Figs. 4, 5, and 6 exhibit a front, side, and back view of the machine-frame. The wheel *c*, being surmounted by a small pinion, communicates with the graduating-screw through the agency of wheel *f* and box K, (seen upon the graduating-screw *g*,) resting upon the cap I at the head of the pillar on the base-plate *o*.

*e* represents a wheel placed between the pinion *c* and graduating-screw wheel *f* for communicating motion. Consequently the movement of the graduating-screw wheel *f* with box K and screw *g*, together with the head and foot blocks *v v*, and ribs *x x*, attached thereto by jaws *w w*, is effected at the same time the fliers are revolving. B, the action of the main cog *u*, and by the movement of the cam *q q* operating upon the pin *r*, the governor *m* is carried up and down, and consequently the fliers *d d*, held by the collars S S in the governor, receive an endwise movement at the same time they revolve, sufficient to separate the dent by the cutting-edge of the flier in the box B from the supplying piece of wire.

Thus by the action of the main cog *u* and the cam *q q* the fliers are made to perform the operation of cutting off the dent, and winding the band round the ribs of the reed, and it will be observed that while the fliers are thus made to move the box K is carried round the graduating-screw *g* by the movement of the gear *f*, *e*, and *c*, connected with the operation of the wheels of the fliers, and the graduating-screw with the ribs of the reed, are made to move through the machine. It will also be further observed that by the action of the governor *m* the movement of the small lever *n*, bearing upon the lower feeding-roll, is effected. The movement of the main shaft *a* with the lower (bevel) wheel, S, operates upon the upper feeding-roller, *b*, and the upper feeding-roller effects the positive movements of the lower feeding-roller, *b*, by the connecting-gear placed upon the shaft both of the upper and lower feeding-rollers, as is represented at *t t*, by which arrangement the wire is carried into the machine.

On reference to the skeleton view of the machine under Fig. 3, the connection of the lever *n* by a spiral spring to a small arm attached to the lower end of the governor, and the manner in which this lever is brought to bear upon the lower feeding-roller, *b*, will be seen, and where the fulcrum *p* is also represented in position for giving support to the end of the lever. On further reference to 3, Fig. 8, the form of both the arm and lever may be seen.

By the action of the governor *m* upon the lever *n* and the application of a screw for the fulcrum, as seen in the diagram at *p*, Fig. 3, the lower feeding-roller can at any time, even during the operation of the machine, be brought up to bear upon the wire with any requisite degree of pressure for carrying the wire into the machine. The fulcrum $p$, being a screw, is made to pass through the brace F, where it is confined in any required position by the windlass-nut G, as seen under Figs. 1 and 2, and at 3, Fig. 11.

The passage of the wire to and from the feeding-rollers is through the tubes V′ and V². The first is illustrated in an end, side, and longitudinal view, which may be seen at 1, 2, and 3, V², Fig. 11, under the part of the machine in which it belongs. V² is illustrated in a side, end, and sectional view under 4, 5, and 6, 2, Fig. 7, where the dotted line in the base-plate O shows the place this tubular screw occupies in the base-plate when in the machine. The precise position of this essential part of the combination may be seen in the entire machine at V² under Fig. 2, where it has been calculated to conduct the wire directly to the orifice of the flier-step R. On passing this fistular screw the wire enters the flier-step R, (illustrated at 1 R in the machine under Fig. 2, and at 1, 2, 3, and 4, Fig. 13, and also under 5, 6, 7, and 8, Fig. 13, upon an enlarged scale, where the particular form of the passage for the wire is indicated, and the plan of the step containing a small piece of wire represented on the end of an inverted flier under 6, Fig. 12, immediately below.) Here the manner in which the wire is made to pass through the step between the ribs $x$ $x$, and the way the band is discharged from the bobbin U upon the ribs, is shown. On examining this diagram further, will be seen a dotted line upon the piece of wire, represented as crossing the step between the ribs above the end of the flier. The end of the gage M, employed for the double purpose of keeping the ribs $x$ $x$ asunder, and the wire in its passage from an interference with the barrel of the flier or the ribs of the reed, will be found here, and further illustrated at M², Fig. 12, where an edge and side view is represented, the latter with one branch passing through the body of a flier in a position, as may be seen, to keep the wire down. In the machine this gage is held in a proper position to perform its office by the crane L. On passing the foot of the flier the wire enters a channel, formed of hard metal, in the base-plate O, of sufficient width and depth to admit the wire to pass, as may be seen on reference to the base-plate O at 1, 4, and 5, Fig. 7, where this channel is represented in the base-plate at 1 on a line with the fliers and the orifice of the fistular screw V. On the side of the base-plate a face, side, and end view of this channel 1 may be seen. It will be observed that in this representation of the base-plate and wire-channel that the channel is open upon the face of the plate, and that in this place there is no visible object to prevent the wire in its passage through this channel from coming out, and the more readily so when the base-plate is reversed and stands in an opposite and its proper position in the machine, and the wire becomes crooked or bent down before it reaches this channel.

To effect a direct and certain passage for the wire the sliding gages seen at $l$ $l$, Figs. 2 and 3 are employed, and constitute the fifth movement in the machine. At 5, Fig. 7. upon the base-plate, those gages are represented in proper form for a stationary machine, together with the spring $k$ $k$ inverted, which will illustrate the manner of covering the channel 1 during the passage of the wire from the first to the second set of ribs, and thereby prevent its taking an improper direction.

At 1 and 2, Fig. 15, a side and connected edge view of the sliding gages $l$ $l$, together with the spring $k$, may be more particularly seen, and the manner in which they are connected with the wedge and sweep, so as to act alternately in covering the channel 1 with the movement of the wire, is illustrated under 1 and 2, Fig. 16, where it will be seen that by the sweep $h$ being operated upon by a small screw or pin moving in the slotted end of the sweep attached in an eccentric position to the lower end of the main shaft $a$, the wedge $i$, in connection with sweep $h$ and spring $k$, (which passes through the opening in the wedge, as seen at $k$, pressing against the inclined sides,) will be moved in the revolution of the main shaft $a$, and consequently the sliding gages, by the compression and expansion of said spring, must be operated upon, carried out to cover the passage of the dent, and drawn back as the fliers descend, to admit of the dents falling. On further examination of the diagram under 5, Fig. 7, will be found the spring-conductors T, more fully represented at T² 6, Fig. 7. These conductors extend around the back ribs, and are composed each of two springs nearly meeting in front of the same, and are made to act and exert a slight pressure upon the wire, gently bearing upon the edge and keeping it on a direct line between the second set of ribs, $x$ $x$, and thereby preventing the wire in this part of its passage from interfering with the ribs. On passing the spring-conductors T, the wire advances between the ribs $x$ $x$ to the inside of the box R, and stops against the metal, on a line with the outer edge of the second flier, where it lies in a position to be cut from the supplying-piece by the descending movement of the flier. The cam $q$ $q$ and sweep $h$ are so formed and placed as to maintain a reciprocating movement, and in their action to carry the sliding gages back, and open a free passage for the dent to fall when it is separated from the supplying-piece of wire by the cutting-edge of the descending flier; and I will also here remark that by the construction of the cam $q$ $q$, the fliers are kept down until they perform nearly two-thirds of their revolution, and that as they are raised to take their elevated position the arm at the lower end of the governor $m$, through the agency of the small spiral spring, operates upon the lever $n$ in elevating the lower feeding-roller, which, coming in firm contact with the wire, again sends it into the machine, at which time the sliding gages $l$ $l$ are again extended by the action of the sweep *h*, wedge *i*, and spring *k*, forming a closed and secure passage for the wire through the channel 1 to the second flier-step, as before described.

Having now shown the parts of which the movements of the machine consists, and their connection in gear, and the manner in which they are brought to act upon the reed, I will further illustrate the mode of their adjustment and adaptation for the manufacture of different kinds of fine and coarse reeds.

6, Fig. 7, represents an adjustable base-plate, in which it will be observed there is a difference not only in the form of the plate, but in the size and distance of the fliers. In this plate one set of fliers are small, standing near together, and the other set of fliers are large, and placed at a greater distance from each other. One is intended for fine reeds, and the other coarse or heavy work. It will also be observed that the sliding gages *l l* are made double, connected by a long arm and thereby capable of being drawn out, with the movable flier, and extended to any requisite point of action, and that the spring-conductors T are also carried along with the sliding gage *l l*, step R, and flier *d*. The screw and nut W $W^2$ are calculated to move the adjustable flier, and to hold it in any required point firm for action.

7, Fig. 7, represents the manner in which I confine the flier-step R in the base-plate O, after the step has been adjusted.

$R^2$ exhibits a transverse section of a thin nut employed for the purpose of holding the flier-step fixed in its adjusted position.

$R^3$ is a face view of the nut, which is not only employed in the adjustable flier, but is equally useful in holding the other steps, but more especially so in confining the upper step or collar of the flier seen at S, 1, 2, and 3, 5, Fig. 8, where the face of the nut is again represented, with an edge view above, upon the collar S, and still higher may be seen the nut and collar fixed to the governor *m*. $S^4$ and 5 on the left immediately under the governor *m* represent a face and end view of the slide or box, which receives the collar S and flier intended for adjustment. It will be perceived that this box is made somewhat wider on the under than on the upper side, and that in consequence, by the action of the nut upon the collar when in this block, and fitted in its place upon the governor, the block may be drawn up firmly and fixed permanently, together with the collar, in any point required for the action of the adjustable flier in the governor; and this is not the only advantage derived from the employment of the nut herein lastly described, for at any time when it becomes necessary to give more or less elevation to the position of any flier, by first running the nut back, the collar S can be easily turned, and, by its screw, either elevated or depressed, and then, by the act of the nut, again made perfectly secure for the action of the flier.

4, Fig. 8, represents the top view of the governor. *m*, 7 7, shows the circle upon which two small communicating wheels are made to move, and thereby connect the movement of the flier-wheels in any position they may be placed for action. 6 shows the position of a pin or rack screwed into the governor for giving motion to the same, which pin will be more plainly seen at 6 in the governor *m*, Fig. 24, where the simple action of a lever, *n'*, connected with the sweep *h*, gives the fliers their endwise movement in the direction of the dart. Here the cams *q q* are dispensed with, as well as the wedge *i* and spring *k*, and the end of the sweep *h*, or that of the lever *n*, near where they are connected, made into a wedge in such form as to act directly upon the sliding gages and carry them out and in, as may be necessary for covering the channel and effecting, as before described, the passage of the dent from the first to the second set of fliers.

Under 2, Fig. 20, will be seen the lower end of the main shaft *a*, exhibiting a circular row of holes diverging from the center of the main shaft, and calculated for the reception of a screw or pin to operate in the slotted head of the sweep *h*, and thereby admit of an adjustment in the movement of the sweep, and consequently of a greater or less extension in the movement of the governor and fliers an advantage of some importance in operating upon fine and coarse reeds.

By the employment of the lever *n* much less power and noise are necessary in effecting the movement of the machine than has been found unavoidable by the use of the cam *q q*, and by converting the upper end of the lever *n* into a small segment of a circle, with teeth corresponding to those on the rack or pin 6, and making the lower end of the lever and sweep *h* with teeth to correspond, the lever *n* may be made to act upon the governor with the least possible friction, with great ease, and almost without noise. I should also add that in the adjustable machine, especially when one side is intended for strong or coarse and the other for fine or light reeds, I employ what I call a "conical" feeding-roller—that is, the roller on the light or fine side is somewhat smaller in diameter than that employed on the coarse or heavy side, by which means there are more ease and accuracy in feeding the wire into the machine.

For a more full and particular illustration of some sectional and other views of parts of the machine not thoroughly described, with the movements as I have placed them for action upon the reed, reference may be made to the following diagram—namely, under 1, 2, 3, 4, and 5, Fig. 7, will be found different views of the stationary base-plate.

1, 2, and 3, Fig. 8, represents the stationary governor; 1 and 2, Fig. 9, steps of the main shaft *a;* 1 2, Fig. 10, steps of the feeding-rollers *b b;* 1, 2, and 3, Fig. 11, conductors, brace-screws, tubes, and fulcrum E F G V *p;* 1, 2, and 3, Fig. 12, fliers on a small scale. 4, 5, and 6, Fig. 12, are enlarged views of the fliers *d*, exhibiting the ribs *x x*, bobbins U, and band; 1, 2, 3, and 4, Fig. 13, side, end, face, and back view of the flier-step R upon a small scale; 5, 6, 7, and 8, Fig. 13, the flier-steps upon an enlarged scale; 1 and 2, Fig. 15, sliding gages *l l*, in connection with the spring *k;* 1 and 2, Fig. 16, sweep *h*, wedge *i*, and spring *k*, connected as represented for action; Fig. 17, graduating-screw in the female box K; 1, 2, and 3, Fig. 18, head and foot blocks *v v*, together with the jaws and thumb-screws *w w;* 1 and 2, Figs. 19, ground view of the machine with the communicator *e* and bridge Q; 1, Fig. 20, main shaft *a*, with main cog *u*, windlass H, cam *q q*, bevel-wheel S, in connection with the feeding-rollers *b b* and the sweep *h;* Fig. 21, enlarged view of the bridge Q, with pinion *e;* Fig. 22, tin door N; Fig. 23, wire rim O.

Having thus shown the parts of which the movements of the improved reed machine consists, and their connection in gear, and the manner in which they are made adjustable to operate upon different kinds of reeds, it remains for me to show more particularly how the movement of each part takes place in their action upon the reed. And first, it is necessary to state that the band exhibited on the bobbin U U is placed in the fliers and the ribs *x x* passed through the fliers and bobbins as they are represented in the machine under Fig. 2, where the band may be seen represented upon the ribs, and the ribs in the fliers fastened by their ends to the head and foot blocks *w w*, with a portion of the reed as it is made by the operation of the machine. On reference to diagrams under 4, 5, and 6, Fig. 12, the track of the band from the bobbin U to the ribs *x x* of the reed may be traced. The rim of wire seen under Fig. 23 being properly placed so as to discharge the wire into the machine, the loose end of the wire is then passed between the accelerating-rollers P P, moved by the band seen upon the graduator-pulley on the end of the driving-shaft $A^3$, and from the accelerators the end of the wire is carried on in the direction of the darts, through the tube V, to the feeding-rollers *b b*, where the end of the wire is placed between the feeding-rollers *b b* ready for their action in sending it into the reed, the graduating-screw *g*, with the head and foot blocks *v v*, fastened thereto, holding the ribs *x x* on a line through the fliers in the machine, being raised in the machine and suspended by the box K at a height sufficient to give in the descent of the ribs the required length to the reed. The lamps *z* being also lighted, and all parts of the machine immediately in contact with the banding of the reed being warm, the machine is ready for operation. The main shaft *a* is first put in motion, as represented by the dividing-shaft $A^3$ and bevel-wheel $A^2$, moved by any ordinary power. The cog *u* upon the main shaft *a* being in gear with the communicator *c*, and the upper pinion-wheel of the communicator C being also in gear with the upper communicator *e*, the tire-wheels *d d* and screw-wheel *f* are made to revolve at the same time, and consequently the graduating-screw *g*, with the head and foot blocks *v v* on their ways in the frame, are made to descend with the ribs *x x* while the fliers revolve, and by their action pass the band from the bobbins to the ribs of the reed. While the fliers and graduating-screw, with the band and ribs, are thus in motion, the bevel-wheel S upon the lower end of the main shaft *a*, geared into a corresponding bevel-wheel upon the upper feeding-roller *b*, carries the upper feeding-roller round, which roller being connected with and geared to the lower feeding-roller, *b*, by tooth-wheels *t t*, both of the feeding-rollers thus connected by corresponding motor-wheels *t t*, are made simultaneously to revolve. At the same time the cam *q q*, acting upon the governor *m* by the pin *r*, moves the governor, together with the revolving fliers, and also the lever *n*, attached to the foot of the governor *m* by a small spiral spring, carrying thereby, at the same movement, the fliers above the line on which the wire moves through the orifice in the flier-box R, and elevating the lower revolving feeding-roller, *b*, in such manner as to bring it into contact with the wire and to firmly press the wire between the steel face of the rollers, (designated at 1 2 3 4, Fig. 20,) and thereby carrying the wire into the machine. Consequently, by the simultaneous elevation of the fliers *d d* and the lower feeding-roller, *b*, a passage for the wire is opened through the orifice of the box R, and the wire is moved forward through the orifice on its way into the reed. Immediately preceding the movement of the wire the sliding gages *l l*, by the action of the sweep *h*, are carried out and made to cover the channel 1, through which the wire moves. Thus the wire in a close channel is sent directly through to the spring-gages T, and onward to the end of the passage between the ribs in the flier-box R, in which position the wire rests, until, by the second movement of the sweep *h*, the sliding gages *l l* are carried back and the channel 1 again opened so as to admit of the dropping of the dent under the cutting-edge of the descending flier, at which period in the revolution of the main shaft *a* the governor and fliers, by the action of the cam *q q*, are carried down, when the wire is separated, and the dent under the band discharged from the revolving flier, firmly and accurately fixed in the ribs of the reed. It will be perceived that at time the governor and fliers descend the lever *n* also falls, and that consequently the lower feeding-roller, *b*, drops so far as to leave the wire at rest, and as far as the feeding-rollers *b b* are then concerned entirely free. This double movement in the feeding-roller *b* is essential both in a proper distribution of the reciprocating powers of the machine and in the preservation of the wire from injury, which otherwise, during the time the flier stops the movement of the wire and blocks up its passage through the orifice in the flier-box R, while cutting and winding the dent, the action of the steel rollers would injure the polish on the metal employed for the dent, if they did not otherwise more seriously damage so delicate a part of the reed-wire. At each and every revolution of the main shaft *a* there is one piece or dent cut from the ring of wire on one or both sides of the machine and fixed in the reed. It is, perhaps, useless to say that at each revolution of the main shaft *a* the same movements take place, and the same operations are repeated until the reed is completed of sufficient length.

What has been stated applies to the formation of two reeds, and on examination of the ground-work and different diagrams it will be seen that two or more reeds may be made upon the same principle by doubling the parts. It will also appear evident that any number of these combinations of machines may be so placed as to receive an impulse from the first moving power, whether it be produced by man, horse, water, steam, or any kind of power which can be conveniently obtained in the place where these combinations of machinery may be used, by which combination one machine may now be made to perform the operation of making all kind of reeds now in use. Consequently, a combination or series of machines, as was before this discovery found necessary, for making the different kind of reeds are now rendered useless, and not only their cost and the room they occupy saved, but a variety of other inconveniencies in the adjustment of their individual parts, and adaptation to make some particular kind of reeds, entirely avoided.

I shall now proceed to point out some variations and minor combinations contemplated and employed in the machine, which are not particularly exhibited in the general plan. It will be perceived that the passage of the wire which forms the dent in the reed is effected by rollers operating together. The movement of the wire, however, may be as readily and well performed by the application of pliers, which may be carried backward and forward, so as to effect the movement of the dent-wire, by the action of an eccentric, crank, or cam applied to the main shaft *a*. I should also here observe that there are now in use a great variety of reeds, which are called "fancy" or "dressers," which are generally made with omissions in the dents, according to the work for which those reeds are designed. In making all such kinds of reeds by the machine, it is only necessary for the feeding rollers or pliers, whichever are employed, to have an alternate or intermittent action upon the wire of which the reed is formed. This alternate or intermittent action may be obtained by the application of a lever, wedge, or cam-like movement brought to bear upon the press, roller, or plier through the agency of a small pinion or wheel attached to the main shaft *a*, or any other wheel or part convenient to the pliers or feeding-rollers, and moving in the same order of time with the main shaft or fliers of the machine. Many of the heavy or coarse kinds of reeds are preferred, with two turns of the band to one dent. This operation can be performed by the machine in two different ways—first, by the application of the principle lastly mentioned of feeding the wire intermittingly, and, secondly, by the use of two or more bobbins of banding in each flier, according to the number of turns of banding required to be placed between each dent in the reed, with separate passage in the flier, through which the different bands may at once be discharged upon ribs of the reed, and thus one or more threads may be placed between every dent of a reed at each and every revolution of the flier.

An endwise movement may be given to the flier independently of the cam *q q* or use of the governor *m* simply by the construction of a cam-like grooove on any convenient part of the shaft or wheel of the flier, whereby it may be thrown backward and forward in an endwise movement as it performs a revolution and the cam is brought to bear upon a stationary pin.

The movement of the graduating-screw with the ribs in the machine may be effected by the agency of a pinion on one of the fliers, or one of the flier-wheels acting upon the graduating screw-wheel *f*.

The movement of the sliding gages may be effected in different ways. The rising or descending movement of the governor or fliers may be extended by a wedge or lever through the base-plate to the sliding gages, fully as direct as by the use of the sweep *h*, wedge *i*, and spring *k*. A motion may also be taken from the sweep *h* upon the principle of a wedge, so as to effect the necessary movement of the sliding gages without the present wedge *i* and spring *k*.

On reference to the drawings under 4, Fig. 12, a dotted line will be perceived, indicating a passage for the band, in the wing of the flier, cut deep in the metal, in such manner as to prevent the blaze of the lamps from coming in contact with the band, and at the same time affording the greatest possible protection against the cold air by a more regular and constant heat in this covered and constantly warm passage, which is of great importance in many respects, besides the preservation of the band from fire.

With conical feeding-rollers—that is, where a machine is made adjustable and calculated to set heavy work on one side and light work on the other—it is of some importance to proportion the size of the feeding-roller wheel to the length of the dent. In such cases I make the two feeding-rollers conical, so far as to enable them to send the dent home on either side, regulating all smaller sizes by the fulcrum *p* and the action of the lever *n*.

The movement of the cam *q q*, or any other cam upon the main shaft deemed requisite, may be brought to act upon the feeding-roller, and regulate its action upon the wire; or a motion may be obtained from the action of the flier sufficiently direct to stop the movement of the wire, or the action of the feeding-roller upon the wire during the cutting and winding of the dent.

By the application of an eccentric to the main shaft *a*, a wedge may be so moved on a direct line from the eccentric to the flier as to give an endwise movement to one or both sets of fliers with or without the aid of the governor.

By placing a wedge upon the sweep *h* near where it crosses the feeding-roller *b*, so as to bear upon the press-roller *b* in the movement of the sweep, the feeding-rollers may be so acted upon as to regulate the feeding of the wire and produce the requisite length of dent.

On reference to the diagram under 4, Fig. 8, will be seen at 7 7 the position of two communicating wheels calculated to connect the movement of the fliers at the different points they may be placed in as respects their distance, respectively, from the first flier on either side in operating upon different kind of reeds. The stud which I employ for sustaining this communicator is tubular or hollow, made for a bolt to pass from the under side of the governor *m*, and draw through this stud and the communicating wheel by a nut at top, which is calculated to secure at once the stud in any required point upon the governor for giving support to the communicator and keeping it on the stud for action.

Having thus described the improvements on my original reed-machine and pointed out each part employed in the combination, and the manner in which they are connected and brought to bear and act upon each other, and having also described the manner in which I apply the stock or material of which the reed is formed, so as to receive the direct action of the machine in the production of a reed, and having, moreover, pointed out the variations and minor combinations contemplated and employed in the machine, I will now show the particular points in which the improvements differ from the original reed-machine.

*Organization and general plan of the improved reed-machine.*

In the improved reed-machine the fliers and graduating-screw *d d* and *g* are brought to act parallel with and near to the main shaft *a*, and the feeding-rollers *b b* to move directly under at right angles with and to receive their motion from the main shaft *a*, which, by a bevel-wheel, *s*, carries the feeding-rollers round, which rollers have an intermittent action upon the wire, the lower roller being made to rise and fall in its steps, as befored explained, and both feeding-rollers being, moreover, connected and made to move simultaneously together by the application of what are called "meter" or "square-tooth" wheels. Thus the lower feeding-roller, *b*, has two motions—one rotary upon its axis, and the other vibratory—alternately acting with the endwise movement of the fliers upon the wire, which, in the elevation of the lower feeding-roller by the lever *n*, is pressed between the feeding-rollers and comes forward into the machine. But one graduating-screw is employed in this new combination, which passes in a central point between the fliers, parallel with them and the main shaft *a*, serving at once as a graduating-screw and a carriage for the ribs through the machine, and on this screw but one box containing a female screw for regulating the movement of the ribs, as seen at *g* and K, Fig. 7. But one solid piece is used for the flier, and this is not only made to shield the band from both the heat and cold beyond a proper degree, but to enter the flier-wheel by a screw and move in a collar placed upon the flier immediately under the wheel, also having the advantage of an exterior screw capable of elevating or depressing the flier, and thereby regulating its height in the governor, and at any time equalizing the relative positions of the fliers for action in the machine. By the adjustments represented under 6 and 7, Fig. 7, 4 and 5, Fig. 8, and 1 and 2, Fig. 20, with Fig. 24, every requisite position and movement of the fliers *d d* and sliding gages *l l l l* with the spring-conductors T are readily obtained in a simple and direct manner for the manufacture of all kind of reeds usually employed in weaving upon one and the same machine. By the cam *q q* an endwise movement is at once communicated to the fliers *d d* for cutting the dents of the reed, and to the lower feeding-roller, *b*, by the action of the lever *n*, for carrying the wire into the machine. By the further arrangement of the pinion and communicator *c e*, for adjustment with the bridge Q, Fig. 21, every requisite degree of fineness in the quality of this reed may be produced simply by a change of the graduating screw-wheel *f*, or, in extraordinary cases, the pinion-wheel *c*, which organization and general plan of the improved reed-machine differs from the original reed-machine in the following respects, namely:

In the original reed-machine the main shaft is placed much below the fliers, and brought to act at right angles with the fliers, carriage, and the ribs, as may be seen on reference to *a*, Fig. 7, Plan 1, where is represented a bevel-wheel upon the main shaft *a* as in gear with one upon the first vertical shaft, *b*, geared above into a long horizontal shaft, *c*, which, through the further agency of two short vertical shafts, *d d*, carries the motion of the main shaft *a* down to the flier-wheels *e e*. Thus four shafts and eight extra wheels are here employed over and above what are used in this part of the operation in the improved reed-machine. The feeding-rollers seen at *h h* under Fig. 9, in the diagram immediately below, are made to receive their motion from the main shaft (here represented under the letter *l*) by the inclined shaft *k*, which is geared into the lower feeding-roller bevel-wheel. These feeding-rollers have no miter-wheels or connecting-gear to effect their simultaneous movement. The upper feeding-roller is held down upon the lower feeding-roller by a hook and weight, as may be seen at *m n* in this diagram, and at *y* and *z* under Fig. 8, and again at *g* and *h*, Fig. 7. Consequently the upper feeding-roller was, in the old combination, the press-roller, and had only one movement, and that not compelled by any gear and depending alone on the friction occasioned by the movement of the lower roller with the wire. Thus one shaft and two wheels extra are here employed over and above what are used in this part of the operation in the improved machine, and no arrangement whatever made for feeding different lengths of dent, or for relieving the wire from friction by the over action and pressure of these rollers.

In the original machine will be found two graduating-screws connected with a heavy wooden frame-work, bolted together and calculated to move with two wheels, each placed upon solid boxes carrying two dies each, (seen under Fig. 17,) so as to hold, by a female screw in the ends of those dies, the graduating-screws, and by the movement of the two wheels seen at *e e*, Fig. 14, connected with the flier-wheels, as represented in the ground plan of the upper gear at *c c*, Fig. 6, to regulate the movement of the carriage with the ribs. On examination it will be found that both graduating-screws are placed on the outside of the fliers, by the side of the machine and within the outer frame-work and pillars which support the movements; that the carriage has no bearing-ways or guides, excepting upon the boxes seen at *e*, Fig. 14, and illustrated with the dies under Fig. 17, and that consequently it is difficult, in the first plan, to elevate such carriage with the ribs and set it plumb, suspended as it is by two small boxes on slender screws—and much more so when operating upon a reed—to keep the carriage from swinging, and thereby producing inaccuracy in the setting of the reed. And these were not the only difficulties. The room for adjustment of the two graduating-screws for making the different kind of reeds is so limited, not only in the carriage, but in the interfering frame-work of the machine, that but a very few kinds of reeds could be made by the use of these screws in the machine.

By the mode adopted in the improved combination, one screw with a wheel and upward of thirty pieces in the carriage frame-work have been dispensed with, and a positive, accurate, and easy movement of the ribs obtained, with an advantage of every requisite degree of adjustment with facility in making all kinds of reeds.

In the original reed-machine the flier was not only made of two parts—the body and shell—as seen at *e j k l*, Fig. 12, in parts, and under Fig. 18 as they are connected together, but it was mounted in a collar at the lower end, as seen at *h i*, Fig. 12, and *b*, Fig. 18, calculated to receive the screws on opposite sides of a lever, as represented at *r r r r*, Fig. 11, where a transverse section of the flier appears in the collar, confined by the screws in the lever for action in its endwise movement, through the agency of the levers and pitman *d e g h*, acted upon by the cam *b* on the main shaft *a* through the further agency of the stirrup *c*. (Seen under Fig. 10.) This flier was, moreover, destitute of a screw upon its shaft whereby the wheel could be run on and off and the collar kept snug while exercising the flier in its endwise movement. The collar is also destitute of an external screw, and there was no arrangement for the adjustment of the flier whereby it could be brought to stand square on a horizontal line, and thereby always be easily adjusted to lay the dents level. Independently of these inconveniences, the great distance of the flier from the main shaft always made it difficult, through the agency of so many levers and parts, with the uncertain action of two springs, as represented at *f f*, Fig. 10, to effect a positive or sufficient movement of the flier to pass the dent into the reed, especially when the ribs or banding in the flier were much binding. The flier was, moreover, destitute of a shield for the band, (as has been represented in the improvements,) and in consequence was subject to burn or break the band by heat and irregularity in the temperature of the surrounding air, affecting the tension of the band while winding. Thus in the movements and construction of the fliers in the original machine, two springs, six levers, with sundry other connecting parts employed, besides a double cam on the main shaft to put the fliers in motion, are rendered useless, while in the improved machine, with the exception of one cam to act upon the governor, those numerous parts are profitably dispensed with.

In the original reed-machine the sliding gages seen at *o o* under Fig. 8 are operated upon through the agency of two small oblong square pieces of metal, moved in a groove (as represented in the block 3, and again between the gage *o o* at 7 7, Fig. 8) by the wedge *f*, standing connected with the lever *d*, Fig. 10, and movement of the cam *b*. Consequently, on the failure of the springs *f f* (seen in this diagram and under Fig. 11) to throw the lever *d* up, the sliding gages would not be acted upon or moved out, in which case, as it very frequently occurred, the wire would fail in reaching the end of its regular passage, even should it get through the orifice in the die under the end of the flier. This inconvenience in the improved combination is avoided. It will also be observed that in the sliding gages *o o* there is no arrangement whatever for an extension or contraction of their length by adjustment; and on further examination of the groundwork and plan of the original reed-machine it will be seen, by the uniform size and position of the fliers and the arrangement of their steps, the feeding-rollers, sliding gages, upper and lower gearing, that there was no arrangement for readily changing by adjustment the machine so as to make fine and coarse reeds, otherwise than by setting the reeds uniformly with one length of dent and one size in the strength of the ribs, whatever the required fineness of the reed might be.

The only practical adjustment the machine was capable of was in shifting the position of the graduating-screws so as to admit of the application of a very limited number of different-sized change-wheels to regulate the fineness of some few ordinary kinds of reed, and consequently an establishment built upon the original plan would necessarily require the use of a series of ten or twelve, if not even a greater number, of those machines to make the different kinds of reed in general use.

Having thus described the principal points in which the two machines materially differ, I will now proceed to a description of the parts which I claim as improvements upon my original machine.

I claim—

1. The employment of a single screw in a central position to carry the ribs in the fliers through the machine, serving at once as a carriage for the ribs and to graduate the reed, as described, instead of the two screws previously employed.

2. The method of feeding in the dent by means of geared rollers, in combination with the separation of the rollers to arrest the feeding in of the dent, in manner substantially as herein described.

3. The employment of the collar S, with a screw on the outside, as represented, to enter the block of the governor, in combination with the block $S^5$ and slot S in the governor, in the manner described, by which the position of the fliers is regulated vertically and laterally, and, in combination with these parts thus combined, the combination of the parts for setting the lower end of the fliers, as described.

4. The making of a passage for the band in the arm and wing of the fliers, in combination with the passage for it through the nose by the side of the central hole through which the ribs pass, as described, by which construction the band is protected from the flame and the cooling influence of a sudden change of temperature.

5. The employment of the spring-gages for giving a proper direction to the movement of the dent between the second set of ribs, and for keeping the successive dents cut from the supplying-piece of wire on a line with the face of the reed, as represented at T, 5, and 6, Fig. 7.

6. The combination of the wedge, spring K, and sliding gages *l l*, for guiding and sustaining the dents in their passage from the first to the second ribs, as described.

Having thus described the original reed-machine and illustrated the nature of my improvements thereon, it remains for me to state that there is no individual part in the whole combination which may not be formed and constructed of any suitable material and in the usual mode adopted by the makers of machinery; and I hereby further declare that although I prefer placing the machine, as represented in the different diagrams, in an upright or perpendicular position, yet by a trfling variation the same may be used and made to work in a horizontal or oblique position, according to the convenience of the place where the same may be used. The variation consists, principally, in placing the machine upon any suitable frame and suspending a weight to the foot-block *v*, the cord or chain of which passing over a pulley, by which means the parts that before descended by their own gravity will be carried along by the weight; and I further declare that by the application of the improvements illustrated by the drawing and specifications herein described, and lastly enumerated and claimed as my invention, all the different kinds of reed now in use of metallic description can be made on one and the same machine.

In witness whereof I, the said JEPTHA A. WILKINSON, do hereby set my hand this the 10th day of April, in the year of our Lord 1843.

JEPTHA A. WILKINSON.

In presence of—

GILBERT L. GIBERSON,
JAMES V. PATTEN.